(12) United States Patent
Peng et al.

(10) Patent No.: US 12,673,365 B2
(45) Date of Patent: Jul. 7, 2026

(54) METHOD FOR PREPARING SINTERED ANODE ALUMINUM FOIL AND SINTERED ANODE ALUMINUM FOIL

(71) Applicant: Chongqing University, Chongqing City (CN)

(72) Inventors: Jian Peng, Chongqing City (CN);
Mengxiao Li, Chongqing City (CN);
Shejun Ma, Chongqing City (CN);
Yinxing Zhao, Chongqing City (CN);
Jingfeng Wang, Chongqing City (CN);
Fusheng Pan, Chongqing City (CN)

(73) Assignee: Chongqing University, Chongqing City (CN)

(*) Notice: Subject to any disclaimer, the term of this patent is extended or adjusted under 35 U.S.C. 154(b) by 72 days.

(21) Appl. No.: 18/746,292

(22) Filed: Jun. 18, 2024

(65) Prior Publication Data

US 2024/0424556 A1      Dec. 26, 2024

(30) Foreign Application Priority Data

Jun. 20, 2023      (CN) .......................... 202310734402.3

(51) Int. Cl.
B22F 7/04          (2006.01)
B22F 1/065        (2022.01)
(Continued)

(52) U.S. Cl.
CPC ............... B22F 7/04 (2013.01); B22F 1/065 (2022.01); B22F 1/107 (2022.01); B22F 9/04 (2013.01);
(Continued)

(58) Field of Classification Search
CPC .. B22F 1/065; B22F 1/107; B22F 7/04; B22F 9/04; B22F 9/082; B22F 2009/0824;
(Continued)

(56) References Cited

U.S. PATENT DOCUMENTS 9,634,352 B2 * 4/2017 Wang .................... H01M 4/625
2007/0068341 A1 * 3/2007 Cheng ....................... B22F 1/00
75/255

(Continued)

FOREIGN PATENT DOCUMENTS

CN        101670244 A        3/2010
CN        101670244 B        2/2012
(Continued)

OTHER PUBLICATIONS

（王立强等）
"铝粉粒径对铝电解电容器用烧结箔孔隙及电性能的影响（ Effect of aluminum powder particle size on pores and electrical properties of sintered foil for aluminum electrolytic capacitors ）" 电子元件与材料 (Electronic Components and Materials), vol. 41, No. 5 May 2022 pp. 458-472.

*Primary Examiner* — Brian K Talbot

(57)          ABSTRACT

The invention discloses a method for manufacture sintered anode aluminum foil. Ultrasound was used to change the stacking structure of aluminum powder on the surface of the anode aluminum foil, allowing aluminum powder particles of different sizes to form a gradient distribution in the thickness of the aluminum powder layer, with a gradual decrease in average particle size from bottom to top, larger voids in the lower layer, and denser and larger surface area in the upper layer. Therefore, the specific capacitance and the withstand voltage were improved. By introducing ultrasonic vibration, this invention can simultaneously enhance the specific capacitance and withstand voltage of anode aluminum foil after high-temperature sintering and anodizing, while traditional sintering methods cannot obtain high specific capacitance and withstand voltage performance simultaneously.

6 Claims, 4 Drawing Sheets

(51) Int. Cl.

| | |
|---|---|
| *B22F 1/107* | (2022.01) |
| *B22F 9/04* | (2006.01) |
| *B22F 9/08* | (2006.01) |
| *C23C 24/08* | (2006.01) |
| *H01G 4/008* | (2006.01) |
| *C25D 11/16* | (2006.01) |

(52) U.S. Cl.
CPC ............ *B22F 9/082* (2013.01); *C23C 24/087* (2013.01); *H01G 4/0085* (2013.01); *B22F 2009/0824* (2013.01); *B22F 2301/052* (2013.01); *B22F 2998/10* (2013.01); *C25D 11/16* (2013.01)

(58) Field of Classification Search
CPC .......... B22F 2301/052; B22F 2998/10; C23C 24/087; H01G 4/0085; C25D 11/16; B05D 3/007
USPC ................................................. 427/115, 600
See application file for complete search history.

(56) References Cited

U.S. PATENT DOCUMENTS

| | | | | | |
|---|---|---|---|---|---|
| 2011/0053764 | A1* | 3/2011 | Taira | ...................... | B22F 7/002 |
| | | | | | 502/263 |
| 2022/0320480 | A1* | 10/2022 | Li | ..................... | H01M 10/0562 |
| 2022/0324025 | A1* | 10/2022 | Perigo | .................... | B22F 10/20 |
| 2022/0388049 | A1* | 12/2022 | Wang | ....................... | B21B 1/38 |

FOREIGN PATENT DOCUMENTS

| | | | | | |
|---|---|---|---|---|---|
| CN | 102925947 | A | | 2/2013 | |
| CN | 103035585 | A | | 4/2013 | |
| CN | 102925947 | B | | 7/2015 | |
| CN | 110993347 | A | * | 4/2020 | ............ H01G 9/045 |
| CN | 111463016 | A | * | 7/2020 | ............ H01G 9/045 |
| CN | 111463016 | B | | 9/2021 | |
| CN | 111508712 | B | * | 11/2021 | .......... H01G 9/0525 |
| CN | 115064387 | A | * | 9/2022 | ............ H01G 9/045 |
| CN | 115188597 | A | | 10/2022 | |

\* cited by examiner

METHOD FOR PREPARING SINTERED ANODE ALUMINUM FOIL AND SINTERED ANODE ALUMINUM FOIL

BACKGROUND OF THE INVENTION

1. Technical Field

The present invention belongs to the field of new material technology, specifically involving a preparation method and a sintered anode aluminum foil that simultaneously possesses high specific capacitance and withstand voltage performance.

2. Description of Related Art

With the advancement of societal technological levels, the demands and requirements for energy storage electronic components are increasing. Aluminum electrolytic capacitors, due to their features of large specific capacitance, high dielectric strength, low cost, and self-healing capability, are widely favored by researchers.

The traditional method of manufacturing anode aluminum foil involves electrochemical etching of aluminum foil to create pits, increasing the specific surface area, thereby achieving an increase in specific capacitance. However, etching process requires a large amount of acid and pure water, leading to industrial wastewater containing phosphorus and nitrogen, which can cause environmental pollution. Additionally, wastewater treatment increases production costs. Furthermore, the development of etching technology has exceeded sixty years, during which etching have continuously improved. Currently, the surface area expansion ratio achieved through etching is gradually approaching the theoretical limit. It is difficult to further increase the specific capacitance of anode aluminum foil using etching alone with the existing industrial level. Another approach is to increase the relative dielectric constant. However, exploration has revealed that the withstand voltage performance of high dielectric constant compounds available for preparing composite anode aluminum foil is inferior to that of Al2O3. Therefore, this method of increasing the dielectric constant is mostly suitable for low to medium voltage applications.

In recent years, to overcome the limitations of etching processes and high dielectric film technologies, additive manufacturing has been introduced to replace chemical etching. This method involves stacking aluminum powder on the surface of thinning aluminum foil, relying on the surface undulations of the aluminum powder layer to increase the specific surface area of the anode aluminum foil. By using additive manufacturing, the surface undulations of the aluminum powder stacked on both sides of the aluminum foil are more uniform. This approach avoids the uneven distribution of surface area caused by the holes in the inner and outer layers of traditional etched aluminum foil, which limits specific capacitance. Additionally, it enables better lightweight and higher specific capacitance of aluminum electrolytic capacitors, while reducing the environmental pollution that traditional processes may cause.

Based on existing research findings, it has been observed that increasing the thickness of the aluminum powder layer can to some extent enhance the specific capacitance. However, as the thickness of the aluminum powder layer increases, the withstand voltage performance of the anode aluminum foil decreases. If the traditional method of stacking aluminum powder layers is followed, reducing the thickness of the aluminum powder layer is necessary to ensure withstand voltage performance, which in turn weakens the specific capacitance. This undoubtedly poses a challenge for the advancement and application of the technology for preparing capacitor anode aluminum foil through slurry coating and sintering, as it needs to address this issue.

BRIEF SUMMARY OF THE INVENTION

The purpose of the present invention is to provide a preparation method for sintered anode aluminum foil and sintered anode aluminum foil, aiming to address the technical problem of existing anode aluminum foils not being able to simultaneously possess high specific capacitance and withstand voltage performance.

To address the aforementioned technical problem, the present invention adopts the following technical solution:

A preparation method for sintered anode aluminum foil, utilizing ultrasound to alter the stacking structure of aluminum powder on the surface of the anode aluminum foil. This results in a gradient distribution of aluminum powder particles with different sizes in the thickness of the aluminum powder layer, gradually decreasing in average particle size from bottom to top, with larger voids in the lower layer and denser and larger surface area in the upper layer.

Furthermore, it includes the following steps: coating the aluminum foil surface with aluminum powder slurry, followed by ultrasonic treatment to gradually decrease the average particle size of the aluminum powder layer from bottom to top on the surface of the anode aluminum foil. Larger particles form large voids in the lower layer, while extremely fine particles and incomplete shell-shaped particles form a dense surface layer, increasing the specific surface area. After vacuum drying and high-temperature sintering, a porous structure composed of a hollow-structured aluminum powder layer is formed to increase the specific surface area and surface density, thereby improving its specific capacitance and withstand voltage.

Furthermore, the aluminum powder used is high-purity spherical aluminum powder prepared by gas atomization method, with particle diameters ranging from 1 to 10 μm exhibiting a normal distribution.

Furthermore, this specifically includes:

Step (1): dissolving the binder in an organic solvent and mix thoroughly to prepare a solution with a certain viscosity.

Step (2): uniformly mix spherical aluminum powder with pore-forming agent, solder powder, and valve metal powder through grinding.

Step (3): adding the mixed powder from step (2) into the solution prepared in step (1) and stir thoroughly to obtain an aluminum powder slurry.

Step (4): coating the aluminum powder slurry obtained in step (3) onto the pre-treated aluminum foil.

Step (5): subjecting the aluminum foil coated with aluminum powder from step (4) to ultrasonic vibration to improve the stacking state of the aluminum powder.

Step (6): vacuum drying the aluminum foil obtained in step (5) to obtain dried aluminum foil coated with aluminum powder;

Step (7): sintering the aluminum foil obtained from step (6) in an inert atmosphere, and after cooling, obtain the composite sintered foil.

Step (8): the sintered foil obtained in step 7 is anodized to obtain the anode aluminum foil.

Furthermore, the binder comprises at least one of ethyl cellulose, polyacrylamide, or polyvinylidene fluoride. The organic solvent comprises at least one of turpentine alcohol, butyl carbitol, butyl carbitol acetate, ethylene glycol, N-Methylpyrrolidone, or butyl acetate. The pore-forming agent comprises at least one of potato starch or camphor. The solder powder comprises at least one of AlSi12 or K3AlF6, and the valve metal powder comprises at least one of Ti powder, TiO2, or BaTiO3.

Furthermore, the mass fraction of the binder in the solution obtained in step (1) is 5%-10%. The solid content of the aluminum powder slurry in step (3) is 60%-70%, and in step (4), a mechanical device is used to control the coating thickness and uniformity, ensuring that the dried aluminum powder layer thickness after steps (5) and (6) falls within the range of 30-80 μm, with thickness variations not exceeding 30% in different areas.

Furthermore, the pretreatment in step (4) involves lightly grinding the aluminum foil to remove surface oil and some oxide film, followed by immersion in a 0.5 wt. %-5 wt. % NaOH at 40° C.-60° C. for 30 s-300 s, cleaning with deionized water and ethanol after immersion, and then drying with cold air.

Furthermore, in step (5), the ultrasonic vibration has a frequency of 20 kHz to 50 kHz, a power of 150 W to 250 W, and a duration of 30 s to 300 s.

Furthermore, in step (7), the sintering process is as follows: first, ramp up the temperature at a rate of 3 to 10° C./min to 200° C. to 300° C. and hold for 30 to 60 min. Then, ramp up the temperature at a rate of 0.5 to 1° C./min to 450° C. to 500° C. and hold for 4 to 6 h. Finally, ramp up the temperature at a rate of 1 to 5° C./min to 600° C. to 640° C. and hold for 3 to 10 h.

A sintered anode aluminum foil, prepared using the above method, has a surface composed of a porous structure of aluminum powder layers with a hollow structure.

Compared to existing technologies, the present invention has the following beneficial effects:

1: The present invention involves subjecting the aluminum foil coated with aluminum paste to ultrasonic treatment, which can improve the stacking structure of solid components in the aluminum paste, allowing aluminum powder particles of different sizes and compactness to form a gradient distribution in the thickness of the aluminum powder layer. Specifically, solid and coarse particles are positioned in the lower layer, creating large and deep pores in the sintered lower layer that penetrate to the aluminum foil substrate. Non-solid shell-like particles in the upper layer can increase the specific surface area of the aluminum powder layer, while avoiding the weakening of specific capacitance caused by the presence of particles in the lower layer that affect the conductivity of the aluminum powder layer. Meanwhile, very small particles aid in forming a dense layer on the surface of the aluminum foil, thereby enhancing the withstand voltage and preventing pore blockage in the lower layer. After high-temperature sintering and anodizing, this structure can simultaneously improve the specific capacitance and withstand voltage of the anode aluminum foil.

Furthermore, increasing the coating thickness can lead to more defects in the aluminum powder layer and increase the likelihood of pore blockage. Introducing the ultrasonic process allows for the control of the stacking structure of the aluminum powder, enabling the reorganization of previously blocked aluminum powder particles under ultrasonic vibration and reducing the probability of closed pores forming during sintering. From the test results, the anode aluminum foil produced by the present invention after ultrasonic treatment not only improves specific capacitance but exhibits good and stable withstand voltage. For samples with an aluminum powder layer thickness of 80 μm after drying, after being subjected to anodization at 520 V, the anode aluminum foil achieves specific capacitance of above 1.01 μF/cm2 and withstand voltage of above 490 V. This meets the requirements of medium to high voltage environments, with a simple process suitable for large-scale production.

2: The present invention achieves uniform aluminum slurry by first mixing the binder with organic solvent to obtain an adhesive liquid, then mixing it with other powders, and adding it to the liquid. The method is simple and highly efficient.

3: In the present invention, the drying stage and sintering stage are conducted separately to avoid rapid heating and temperature increase of the film layer in an incompletely dried state, which could potentially damage the film structure. The specific approach is as follows: first, the aluminum foil coated with the slurry is dried, and then it is sent into a tubular furnace for sintering. Drying first eliminates the fluidity of the slurry, followed by a gradual temperature increase to remove organic matter. The long-term thermal insulation ensures complete removal of organic matter and stabilizes the structure, thereby preventing impurities from deteriorating the specific capacitance.

DETAILED DESCRIPTION OF THE INVENTION

Figure 1:
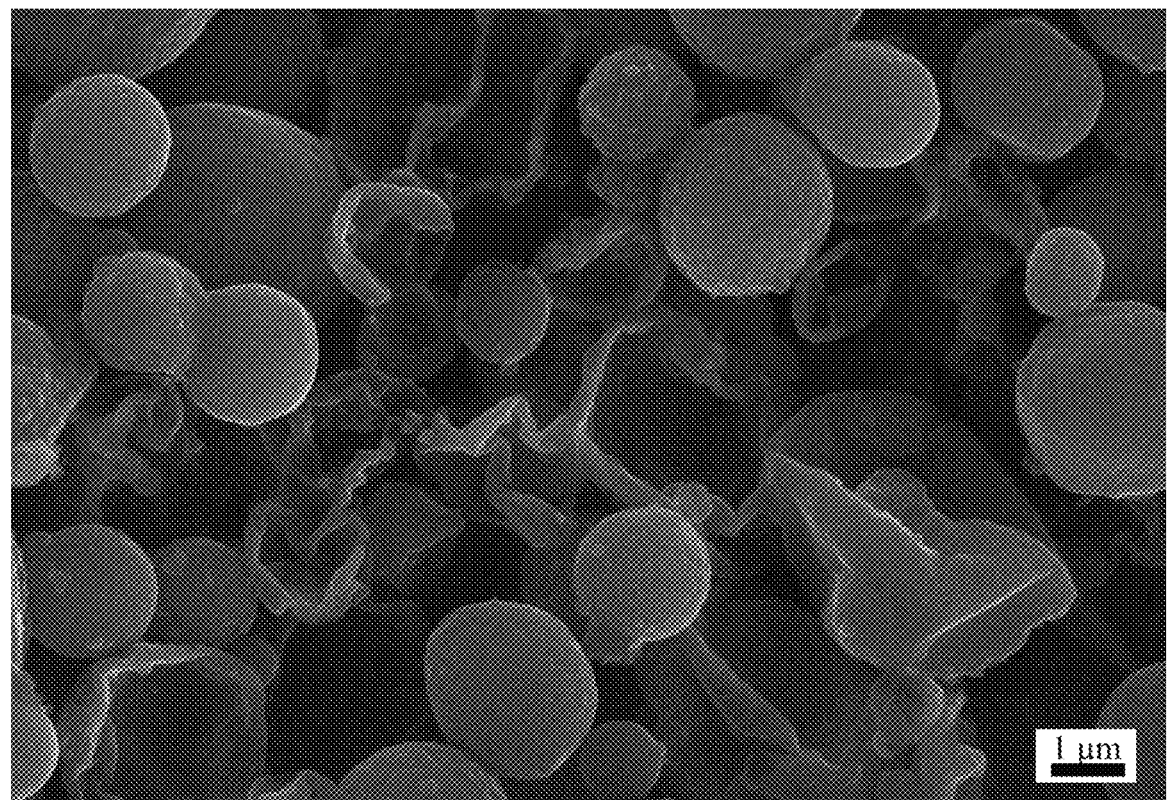
FIG. 1 shows a magnified view of the area where spherical shell particles of the aluminum powder surface layer of the anode aluminum foil prepared in the present invention aggregate.

Below, specific embodiments of the present invention are described in further detail.

In the present invention, numerical ranges should be understood to encompass each individual value between the upper and lower limits of that range. Additionally, any intermediate values within any stated value or range, as well as any other intermediate values or smaller ranges between such stated values or within the range, are also included in the present invention. The upper and lower limits of these smaller ranges may be independently included or excluded from the range.

Unless otherwise specified, all technical and scientific terms used herein have the same meaning as commonly understood by those skilled in the art to which this invention pertains. While the invention has been described with reference to preferred embodiments and examples, it will be appreciated by those skilled in the art that various modifications may be made without departing from the scope of the invention. Any methods and materials similar or equivalent to those described herein can be used in the practice or testing of the present invention. All references mentioned in this specification are hereby incorporated by reference to disclose and describe methods and/or materials that are relevant to the content of this document. In the event of any conflict with the incorporated references, the present specification shall prevail. Terms such as "comprising", "including", "having", and "containing" used in this document are open-ended and intended to mean including but not limited to.

The experimental methods used in the present invention, unless otherwise specified, are conventional methods.

The materials and reagents used in the present invention, unless otherwise specified, can be purchased or synthesized by known methods.

Quantitative experiments in the present invention are conducted with three replicates, and the results are averaged.

1: The present invention provides a method for preparing sintered anode aluminum foil, which uses ultrasonic waves to alter the stacking structure of aluminum powder on the surface of the anode aluminum foil, resulting in a gradient distribution of aluminum powder particle sizes along the thickness of the aluminum powder layer, gradually decreasing from bottom to top, with larger voids in the lower layer and a denser surface layer with a larger specific surface area.

Specifically, aluminum powder slurry is coated onto the surface of the aluminum foil, followed by ultrasonic treatment to gradually reduce the average particle size of the aluminum powder layer from bottom to top on the surface of the anode aluminum foil. Large particles form large voids in the lower layer, while extremely fine particles and incomplete shell-shaped particles form a dense surface layer, increasing the specific surface area. After vacuum drying and high-temperature sintering, a porous structure composed of hollow aluminum powder layers is formed, increasing the specific surface area and surface density, thereby enhancing its specific capacitance and withstand voltage.

The fine particles or ultrafine particles on the upper layer of the aluminum powder layer refer to aluminum powder particles with an average particle size ranging from 1 to 3 μm, while the large particles on the lower layer of the aluminum powder layer refer to aluminum powder particles with an average particle size ranging from 3 to 10 μm.

The aluminum powder is prepared by gas atomization method, exhibiting high purity and spherical morphology, with particle diameters ranging from 1 to 10 μm following a normal distribution pattern. The gas atomization method is a conventional technique.

The specific steps include:

Step (1): dissolving a binder in an organic solvent and stirring to mix evenly, preparing a solution with a certain viscosity;

Step (2): uniformly mixing spherical aluminum powder with a pore-forming agent, brazing powder, and valve metal powder through grinding;

Step (3): adding the mixed powder obtained in step (2) to the solution prepared in step (1), stirring to mix evenly, to obtain aluminum powder paste;

Step (4): coating the aluminum powder paste obtained in step (3) onto pretreated aluminum foil;

Step (5): subjecting the aluminum foil coated with aluminum powder in step (4) to ultrasonic vibration to improve the stacking state of aluminum powder;

Step (6): vacuum drying the aluminum foil obtained in step (5) to obtain dried aluminum foil coated with aluminum powder;

Step (7): sintering the aluminum foil obtained in step (6) in an inert atmosphere, and cooling to obtain a composite sintered foil;

Step (8): the sintered foil obtained in step 7 is anodized to obtain the anode aluminum foil.

The present invention first mixes the organic solvent with the binder using a stirrer until homogeneous. For poorly soluble binders, alternative organic solvents may be selected, or heating and stirring can be employed to facilitate dissolution. Subsequently, spherical aluminum powder, pore-forming agent, welding powder, and valve metal powder are mixed in a grinding bowl. After grinding, the mixed powder is added to the organic solvent containing the binder, and the grinding time is maximized to ensure thorough mixing. Upon addition of the mixed powder to the organic solvent containing the binder, the stirring rate is increased, and the stirring time is extended appropriately to eliminate aggregation of nanoscale powders such as welding powder and titanium powder and ensure thorough mixing, thereby obtaining the aluminum slurry. During the coating process, a mechanical device (automatic coating machine) is used to control the coating thickness and uniformity. After coating, assisted vibration using ultrasonic waves (the aluminum foil should be kept horizontal during vibration) is employed to achieve a gradient distribution of aluminum powder particles in terms of size and fullness within the thickness of the aluminum powder layer. The stacking structure is characterized by: solid large particles at the bottom, resulting in large and deep holes in the sintered aluminum powder layer, penetrating to the aluminum foil substrate. Non-solid shell particles at the top to increase the specific surface area of the aluminum powder layer, while avoiding the influence of the conductivity of the aluminum powder layer in the lower layer and weakening the specific capacitance value. Small particles extremely help to form a dense layer on the surface of the aluminum foil to improve the pressure resistance, avoiding clogging of holes in the lower layer. This structure, after high-temperature sintering and anodization, can simultaneously increase the specific capacitance and withstand voltage of the anode aluminum foil, solving the problem that existing sintering methods cannot produce anode aluminum foil with both high specific capacitance and good withstand voltage.

The aluminum slurry is then dried and sintered to effectively remove organic solvents, binders, and pore-forming agents, and to melt AlSi12 or K3AlF6 as welding powder at high temperatures. During the subsequent cooling process, the welding powder solidifies, forming metallurgical bonds between aluminum powder particles and between the aluminum powder and the aluminum foil, resulting in a sintered foil with strong adhesion of the aluminum powder layer. Finally, through anodization treatment, the resulting converted foil exhibits more uniform thickness of the oxide film in various regions of the plane, avoiding thinning of the oxide film in localized areas, which would otherwise increase the susceptibility to breakdown and decrease the withstand voltage. This process results in an anode aluminum foil with excellent withstand voltage and high specific capacitance.

In step (1), the binder comprises at least one of ethyl cellulose, polyacrylamide, and polyvinylidene fluoride. The organic solvents include at least one of turpentine alcohol, butyl carbitol, butyl carbitol acetate, ethylene glycol, N-Methylpyrrolidone, and butyl acetate. The mass fraction of the binder in the resulting solution is 5% to 10%. The stirring rate is set between 100 and 250 revolutions per minute (rpm), with a lower speed to ensure the effectiveness of the binder is not compromised. The stirring time is not limited, as long as the binder is completely dissolved.

In step (2), the average particle size of the spherical aluminum powder ranges from 2 μm to 8 μm. The purity is above 99.99%, with copper (Cu) content less than or equal to 0.00009%, iron (Fe) content less than or equal to 0.0012%, silicon (Si) content less than or equal to 0.0025%, and moisture content less than or equal to 0.07%.

The pore-forming agent includes at least one of potato starch or camphor balls, primarily serving the purpose of pore formation. During the sintering process, it decomposes to generate pores, thereby expanding the effective specific surface area of the aluminum powder layer.

The solder powder includes at least one of AlSi12 or K3AlF6, primarily serving the function of high-temperature adhesion. Prior to reaching the sintering temperature, the solder powder has melted, and during the cooling process, it solidifies, ensuring a stronger bond between the aluminum powder particles and between the aluminum powder and the aluminum foil.

The valve metal powder includes at least one of Ti powder, TiO2, or BaTiO3. The reason for selecting valve metal powders containing titanium is because their dielectric constant is higher compared to other valve metal oxide dielectric constants, and they are relatively inexpensive. The role of the valve metal powder is twofold: first, it serves as a hard phase, becoming attached to the adjacent aluminum powder particles and promoting the preferential growth of sintering necks. Second, during the formation process, it can form a composite dielectric film with alumina, effectively enhancing the specific capacitance.

The mixing process employs grinding in a mortar, with a grinding time of 10 min to 60 min.

In step (3), the stirring speed is maintained at 400 to 800 revolutions per minute (r/min), and mixing is conducted for 5 to 24 h. A shorter mixing time may result in uneven mixing, while a longer mixing time may lead to increased viscosity of the slurry, which is not conducive to subsequent coating. The solid content of the obtained aluminum slurry is 60 to 70 wt. %.

In step (4), the pretreatment involves lightly grinding the aluminum foil to remove surface oil and partial oxide film. Subsequently, the foil is immersed in a 0.5 wt. % to 5 wt. % NaOH at 40° C. to 60° C. for 30 s to 300 s, followed by rinsing with deionized water and ethanol to remove impurities. The grinding process should be uniform to avoid generating stress that may affect subsequent experiments. The alkaline soaking process is aimed at removing the surface natural oxide layer. Coating is performed using a mechanical device (automatic coating machine) to maintain the thickness of the coated aluminum powder layer at 30 to 80 μm, preferably 50 to 80 μm, after drying.

In step (5), the aluminum foil coated with aluminum powder is subjected to ultrasonic vibration using an ultrasonic generator. The sample should be placed horizontally within the range of the ultrasonic waves. The ultrasonic frequency ranges from 20 kHz to 50 kHz, with a power of 150 W to 250 W, and the ultrasonic treatment duration is between 30 s and 300 s. Through ultrasonic processing, aluminum powder particles of different sizes and densities form a gradient distribution within the thickness of the aluminum powder layer. Solid coarse particles settle in the lower layer, resulting in larger and deeper pores after sintering, penetrating to the aluminum foil substrate. Hollow or less dense particles accumulate in the upper layer, increasing the specific surface area of the aluminum powder layer, while avoiding conductivity issues that may weaken specific capacitance in the lower layers. Ultrafine particles contribute to the formation of a dense layer on the aluminum foil surface, enhancing the dielectric strength and preventing pore blockage in the lower layers. This structured morphology, after high-temperature sintering and anodization, simultaneously enhances the specific capacitance and dielectric strength of the anode aluminum foil. Moreover, by introducing the ultrasonic process, the stacking structure of the aluminum powder can be controlled, reducing the likelihood of pore blockage caused by increased coating thickness. The ultrasonic treatment rearranges small-sized aluminum powder particles, which may otherwise cause pore closure after sintering, thus minimizing the occurrence of closed pores and improving surface area expansion. During ultrasonic treatment, adjustments to the viscosity of the aluminum powder slurry alter its wettability with the aluminum foil, ensuring a relatively stable layer thickness without spreading outward. Within the thickness direction of the slurry layer, aluminum powder particles can still undergo slight positional adjustments under the influence of ultrasonic waves, allowing for the rearrangement of stacking structures, where larger particles settle while smaller particles and hollow spherical particles rise, increasing surface area.

In step (6), the vacuum drying temperature ranges from 40° C. to 120° C., with a duration of 1 h to 8 h, to substantially eliminate the fluidity of the slurry. Optimal conditions are achieved at temperatures between 45° C. and 80° C., with a duration of 2 h to 5 h.

In step (7), the sintering process proceeds as follows: firstly, ramp up the temperature at a rate of 3 to 10° C./min to reach 200° C. to 300° C., and maintain this temperature for 30 min to 60 min. Then, ramp up the temperature at a rate of 0.5 to 1° C./min to reach 450° C. to 500° C., and maintain this temperature for 4 h to 6 h. Finally, ramp up the temperature at a rate of 1 to 5° C./min to reach 600° C. to 640° C., and maintain this temperature for 3 h to 10 h. This sintering process involves a stepwise heating process. The first stage of heating is aimed at solvent removal. The second stage of heating is for degreasing and organic material removal, during which the heating rate needs to be strictly controlled. If the heating rate is too fast, the decomposition rate of organic materials will accelerate, resulting in rapid gas production. The rapid outflow of gas will cause the collapse of the three-dimensional structure built by aluminum powder particles, leading to a decrease in specific capacitance. Therefore, the degreasing stage should proceed slowly to remove organic materials gradually. Prolonged holding time ensures complete removal of organic materials and stabilizes the structure, preventing impurities from deteriorating the specific capacitance. In the third stage, sintering is performed to form sintered necks between aluminum particles, followed by cooling the furnace until the temperature drops below 80° C., at which point the furnace can be opened, and the samples can be removed. The sintering atmosphere is inert gas with a flow rate of 100 to 300 mL/min and a pressure of 0.2 MPa to 0.4 MPa. Prior to heating, inert gas should be introduced for 30 min to 60 min to purge the air and prevent oxidation. Argon is preferably used as the inert gas.

In step (8), anodizing is carried out in a boric acid solution with a concentration of 100 g/L, at a temperature of 88° C. to 95° C., and a voltage of 520 V.

2: The present invention provides a sintered anode aluminum foil, wherein the surface of the anode aluminum foil consists of a porous structure formed by a hollow-structured aluminum powder layer, and the porous structure is composed of spherical particles with different diameters. FIG. 1 is a partial enlarged view of the spherical particle aggregation area on the surface of the aluminum powder layer of the anode aluminum foil prepared according to the present invention. As shown in FIG. 1, after ultrasonic treatment, extremely fine particles and incomplete shell-like particles form a dense surface layer and increase the specific surface area. After vacuum drying and high-temperature sintering, a porous structure composed of a hollow-structured aluminum powder layer is formed to increase the specific surface area and surface density, thereby improving its specific capacitance and withstand voltage.

Example 1

A method for preparing sintered anode aluminum foil with synergistically enhanced specific capacitance and withstand voltage comprises the following steps:

Step 1: dissolve the binder ethyl cellulose in the organic solvent ethyl acetate, and mix thoroughly using a magnetic stirrer (stirring rate of 150 r/min) for 1 hour to obtain a solution of ethyl cellulose with a mass fraction of 5 wt. %.

Step 2: mix thoroughly the spherical aluminum powder with an average particle size of 3 μm, the pore-forming agent (potato starch), the welding powder (AlSi12), and the valve metal powder (Ti powder) through grinding. Specifically, mix aluminum powder, welding powder, pore-forming agent, and valve metal powder in a mass ratio of 80:4:1:1.

Step 3: add the mixed powder from Step 2 into the solution from Step 1, and mix thoroughly using a magnetic stirrer to obtain aluminum slurry. The solid content of the aluminum slurry is 65%. The stirring speed is 500 r/min, and the duration is 5 h.

Step 4: coat the aluminum slurry obtained from Step 3 onto the pre-treated aluminum foil. The pre-treatment involves lightly sanding the aluminum foil with 600 # grit sandpaper to remove surface oil and partial oxide film. Subsequently, immerse the foil in a 5 wt. % NaOH at 60° C. for 2 min, rinse with deionized water, clean with ethanol, and then dry with cold air. Coat is performed using a mechanical device (automatic coating machine) to control thickness and uniformity. Ensure that the coated layer, after Steps 5 and 6, has a dried aluminum powder layer thickness ranging from 30 to 80 μm, with no more than a 30% difference in thickness between different areas.

Step 5: subject the aluminum foil coated in Step 4 to ultrasonic vibration under 40 kHz and 180 W conditions for 60 s to improve the stacking status of the aluminum powder.

Step 6: pass the aluminum foil obtained in Step 5 through vacuum drying at 45° C. for 3 h to obtain dried coated aluminum foil. The thickness of the dried aluminum powder layer is 50 μm, with thickness variations not exceeding 30% in different areas.

Step 7: the aluminum foil obtained in Step 6 is subjected to sintering, with the sintering process as follows: the temperature is raised at a rate of 3.5° C./min to 250° C. and held for 30 min. Then the temperature is further raised at a rate of 0.7° C./min to 500° C. and maintained for 360 min. Finally, the temperature is increased at a rate of 1° C./min to 620° C. and held for 420 min. Thereafter, the furnace is allowed to cool to 80° C., and the composite sintered foil is removed.

Step 8: the sintered foil obtained in Step 7 undergoes anodizing in a stainless steel cup, with the stainless steel cup serving as the cathode and the sintered foil as the anode. The anodizing solution consists of 100 g/L boric acid, with a temperature range of 88° C. to 95° C. and a voltage of 520 V. This process yields the anodized aluminum foil.

In this embodiment, the organic solvent can also be replaced with at least one of turpentine alcohol, butyl carbitol, butyl carbitol acetate, ethylene glycol, and N-Methylpyrrolidone, except for butyl acetate. The binder can be replaced with at least one of polyacrylamide and polyvinylidene fluoride, except for ethyl cellulose. The pore-forming agent can be replaced with at least one of camphor balls, excluding potato starch. The solder powder can be replaced with K3AlF6, except for AlSi12. The valve metal powder can be replaced with at least one of TiO2 and BaTiO3, except for Ti powder.

Example 2

A preparation method for sintered anode aluminum foil, aimed at synergistically improving specific capacitance and withstand voltage, similar to Example 1, with the difference being that in Step 5, the ultrasonic vibration time is extended to 120 s.

Example 3

A preparation method for sintered anode aluminum foil, aimed at synergistically improving specific capacitance and withstand voltage, similar to Example 1, with the difference being that in Step 5, the ultrasonic vibration time is extended to 300 s.

Example 4

A method for preparing sintered anode aluminum foil with synergistically improved specific capacitance and withstand voltage, similar to Example 1, but with the following differences: the average particle size of the aluminum powder in Step 2 is 6 μm. The thickness of the dried aluminum powder layer coated in Step 4 is 30 μm; and the ultrasonic vibration time in Step 5 is 30 s.

Example 5

A method for preparing sintered anode aluminum foil with synergistically improved specific capacitance and withstand voltage, similar to Example 1, but with the following differences: the thickness of the dried aluminum powder layer coated in Step 4 is 80 μm. And the ultrasonic vibration time in Step 5 is 30 s.

Comparison Example 1

A method for preparing sintered anode aluminum foil, similar to Example 1, except that the ultrasonic vibration treatment described in Step 5 was not utilized.

Comparison Example 2

A method for preparing sintered anode aluminum foil, similar to Example 1, except that the thickness of the dried aluminum powder layer after coating in Step 4 is 30 μm; and the ultrasonic vibration treatment described in Step 5 was not utilized.

Comparison Example 3

A method for preparing sintered anode aluminum foil, similar to Example 1, except that the average particle size of the spherical aluminum powder mentioned in Step 2 is 6 μm. The thickness of the dried aluminum powder layer after coating described in Step 4 is 18 μm. And the ultrasonic vibration treatment described in Step 5 was not utilized.

Comparison Example 4

A method for preparing sintered anode aluminum foil, similar to Example 1, except that the thickness of the dried aluminum powder layer after coating described in Step 4 is 80 μm. And the ultrasonic vibration treatment described in Step 5 was not utilized.

Figure 2:
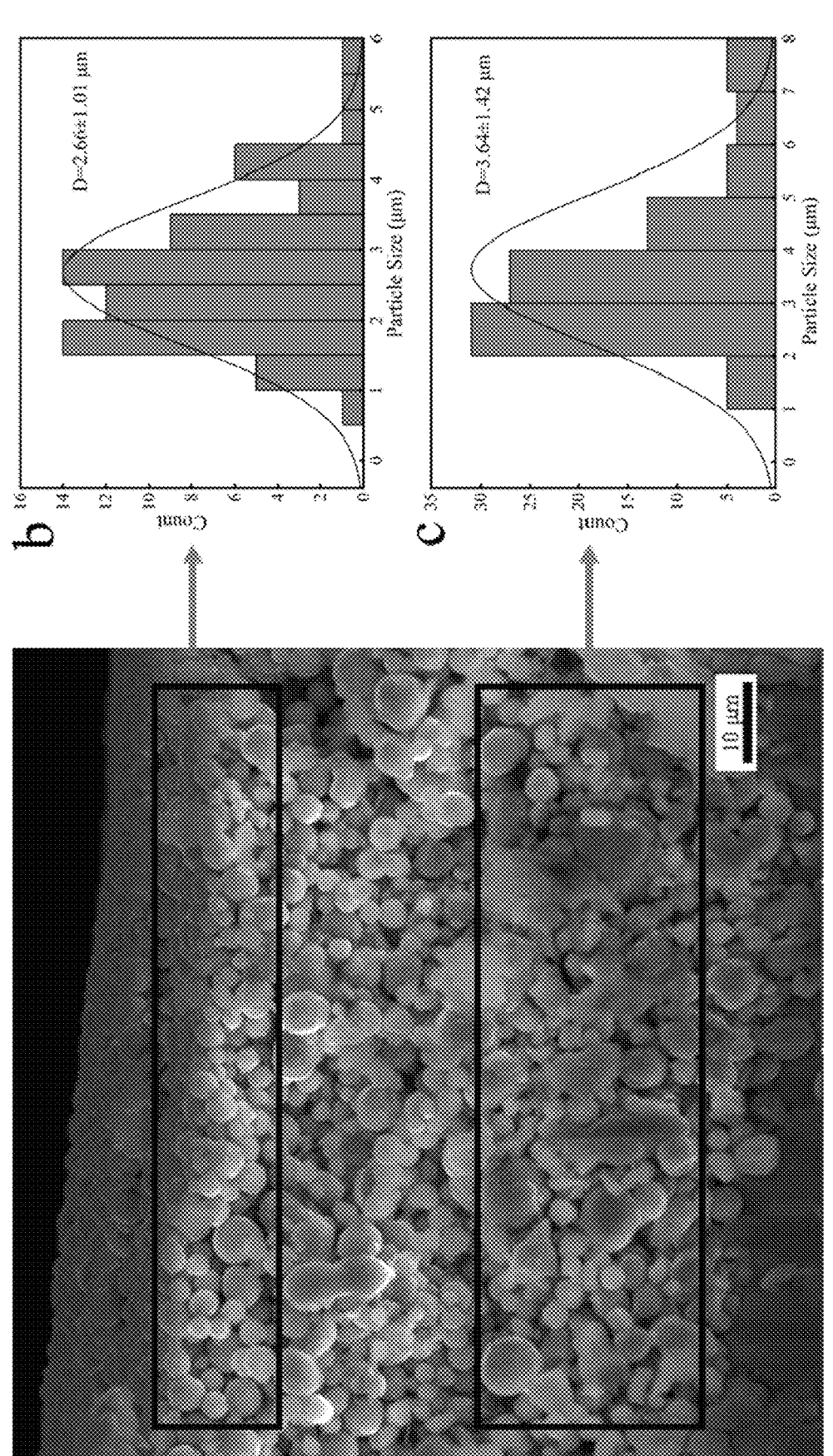
FIG. 2 shows the SEM image and particle size distribution of the cross-section of the aluminum foil after drying in Step (6) of Example 1: (a) is the SEM image of the cross-section of the aluminum foil, from top to bottom corresponding to the surface layer of the aluminum powder layer, the lower layer of the aluminum powder layer, and the aluminum foil layer; (b) is the particle size distribution of the aluminum powder in the surface layer of the aluminum powder layer; (c) is the particle size distribution of the aluminum powder in the lower layer of the aluminum powder layer.
Figure 4:
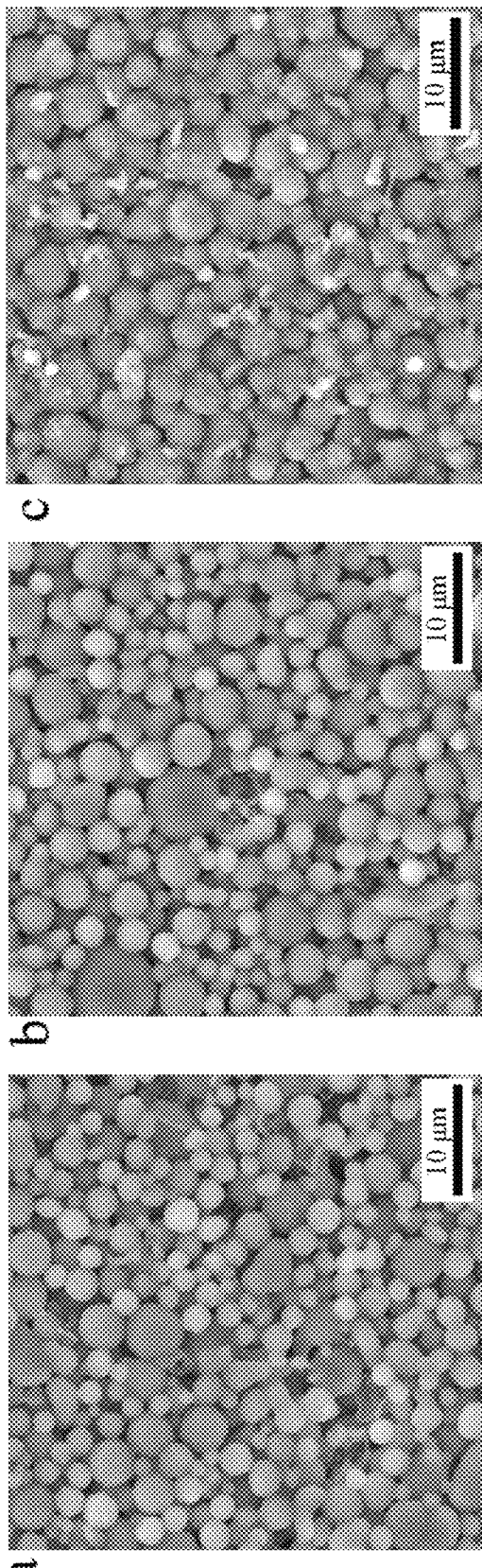
FIG. 4 shows the SEM images of the surface of the aluminum foil after sintering and then subjected to anodic oxidation (forming by 520 V voltage) for Examples 1, 2, and the comparative Example 1: (a) corresponds to Example 1, (b) corresponds to Example 2, and (c) corresponds to the comparative Example 1.

FIG. 2 shows the SEM image and particle size distribution of the aluminum foil cross-section after drying in Step 6 of Example 1: (a) is the SEM image of the aluminum foil FIG. 4 shows the surface SEM images of the electrode foils after anodizing in Example 1, Example 2, and Comparative Example 1: (a) corresponds to Example 1; (b) corresponds to Example 2; (c) corresponds to Comparative Example 1. It can be observed from FIG. 4 that in the samples without ultrasonic treatment, the distribution of the surface oxide film is uneven, and the uneven points are prone to breakdown, resulting in a decrease in withstand voltage. In contrast, in the samples subjected to ultrasonic treatment, the distribution of the surface oxide film after anodizing is uniform. This is because ultrasonic treatment changes the stacking structure of the aluminum powder, increases the porosity, provides enough space for the growth of the oxide film on the inner wall of the pores in the subsequent anodizing process, and forms a uniform and dense oxide film on the surface of the voids and aluminum powder layer, thus enhancing the withstand voltage performance of sintered aluminum foil after anodizing.

The withstand voltage performance and specific capacitance of the sintered anode aluminum foil were tested according to the standard SJ/T 11140-2022, including sample size, test environment, testing equipment, and testing parameters. The test results are shown in Table 1.

TABLE 1

| | | | | | | |
|---|---|---|---|---|---|---|
| | Electrode foil performance parameters | | | | | |
| Example | Particle size of Al powder (μm) | Aluminum powder layer thickness (μm) | Ultrasonic | Withstand voltage (V) | Specific capacitance (μF/cm$^2$) | Aluminum powder layer error |
| Example1 | 3 | 50 | 1 min | 503 | 0.5646 | ≤30% |
| Example2 | 3 | 50 | 2 min | 503 | 0.5864 | ≤30% |
| Example3 | 3 | 50 | 5 min | 508 | 0.5730 | ≤30% |
| Example4 | 6 | 30 | 30 s | 521 | 0.2606 | ≤30% |
| Example5 | 3 | 80 | 30 s | 496 | 1.0103 | ≤30% |
| Comparison Example 1 | 3 | 50 | 0 s | 190 | 0.3940 | / |
| Comparison Example 2 | 3 | 30 | 0 s | 520 | 0.3570 | / |
| Comparison Example 3 | 6 | 18 | 0 s | 492 | 0.2496 | / |
| Comparison Example 4 | 3 | 80 | 0 s | 46 | 1.1910 | / | cross-section, from top to bottom showing the surface layer of the aluminum powder layer, the lower layer of the aluminum powder layer, and the aluminum foil layer; (b) is the particle size distribution of the aluminum powder in the surface layer of the aluminum powder layer; (c) is the particle size distribution of the aluminum powder in the lower layer of the aluminum powder layer. It can be observed from FIG. 2 that the introduction of ultrasonic vibration has led to changes in the distribution of aluminum powder along the thickness direction. The aluminum powder particles in the surface layer are finer compared to those in the lower layer, and there are regions with shell-like structures on the surface, increasing the specific surface area and enhancing the specific capacitance.

Figure 3:
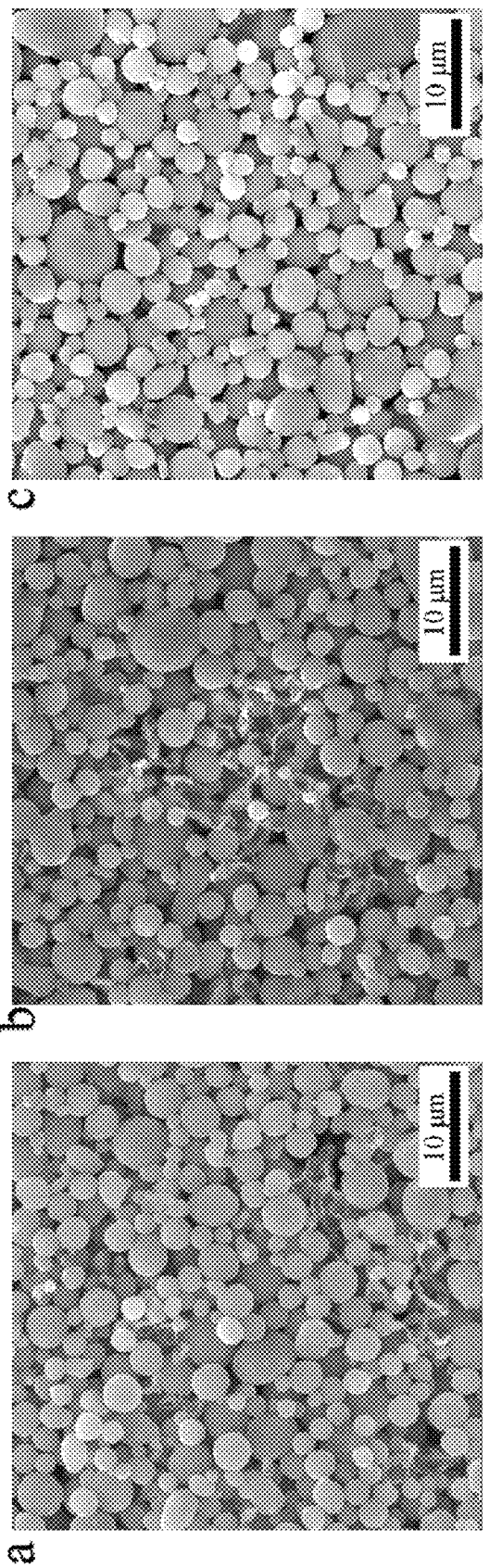
FIG. 3 shows the SEM images of the surface of the aluminum foil after sintering for Examples 1, 2, and the comparative Example 1: (a) corresponds to Example 1, (b) corresponds to Example 2, and (c) corresponds to the comparative Example 1.

FIG. 3 shows the surface SEM images of the electrode foils after sintering in Example 1, Example 2, and Comparative Example 1: (a) corresponds to Example 1; (b) corresponds to Example 2; (c) corresponds to Comparative Example 1. It can be observed from FIG. 3 that compared to the samples without ultrasonic treatment, the surface layer exhibits shell-like structures in some regions after ultrasonic treatment, leading to an increase in specific surface area and specific capacitance.

Comparison between Examples 1-3 and Comparative Example 1 reveals that the introduction of 1 to 5 min of ultrasonic vibration after coating the slurry significantly enhances the withstand voltage and specific capacitance.

From the comparison between Example 4 and Comparative Example 3, it can be observed that the samples subjected to ultrasonic treatment still exhibit higher withstand voltage when coating with thicker aluminum powder (30 μm) compared to thinner aluminum powder (18 μm). It indicates that the anode aluminum foil treated with ultrasonic processing can significantly improve the withstand voltage while ensuring high specific capacitance.

From the comparison between Example 5 and Comparative Example 4, it can be observed that without ultrasonic treatment, when the coating thickness is increased, although the specific capacitance increases, the withstand voltage significantly decreases. However, with ultrasonic treatment, the withstand voltage is significantly improved, making it suitable for medium to high voltage environments. This once again demonstrates that the introduction of ultrasonic treatment can significantly enhance the withstand voltage while ensuring high specific capacitance.

Finally, it should be noted that the above embodiments are only intended to illustrate the technical solutions of the present invention rather than limit the technical solutions. Those skilled in the art should understand that modifications or equivalents to the technical solutions of the present invention, which do not depart from the spirit and scope of the technical solutions, should be encompassed within the scope of the claims of the present invention.

What is claimed is:

1. A method for preparing sintered anode aluminum foil, characterized by using ultrasound to alter a stacking structure of aluminum powder on a surface of the anode aluminum foil, resulting in a gradient distribution of aluminum powder particles with different sizes in a thickness of a aluminum powder layer; from bottom to top, an average particle size gradually decreases, with larger gaps in lower layers and denser and larger surface area in an upper surface layer;

the method includes the following steps: aluminum powder paste is coated on the surface of aluminum foil, and after ultrasonic treatment, the average particle size of aluminum powder layer structure on the surface of anode aluminum foil gradually decreases from bottom to top particles form large pores in the lower layer, while particles and incomplete shell-shaped particles form a dense surface layer with increased surface area in the upper layer; after vacuum drying and sintering, a porous structure consisting of aluminum powder layers with hollow structures is formed to increase the specific surface area and surface layer density, thereby improving specific capacitance and withstand voltage; the aluminum powder is spherical aluminum powder prepared by gas atomization method, with a particle diameter ranging from 1 to 10 μm following a normal distribution;

wherein the method further comprises:

Step (1): dissolving a binder in an organic solvent and stirring to mix evenly, preparing a solution with a certain viscosity;

Step (2): uniformly mixing spherical aluminum powder with a pore-forming agent, brazing powder, and valve metal powder through grinding;

Step (3): adding the spherical aluminum mixed powder obtained in step (2) to the solution prepared in step (1), stirring to mix evenly, to obtain aluminum powder paste;

Step (4): coating the aluminum powder paste obtained in step (3) onto pretreated aluminum foil;

Step (5): subjecting the aluminum foil coated with aluminum powder in step (4) to ultrasonic vibration to improve the stacking state of aluminum powder;

Step (6): vacuum drying the coated aluminum foil obtained in step (5) to obtain dried aluminum foil coated with aluminum powder;

Step (7): sintering the dried aluminum foil obtained in step (6) in an inert atmosphere, and cooling to obtain a composite sintered foil;

Step (8): the composite sintered foil obtained in step 7 is anodized to obtain the sintered anode aluminum foil.

2. The method of claim 1, wherein the binder is at least one of ethyl cellulose, polyacrylamide, and polyvinylidene fluoride; the organic solvent is at least one of turpentine alcohol, butyl carbitol, butyl carbitol acetate, ethylene glycol, N-Methylpyrrolidone, and butyl acetate; the pore-forming agent is at least one of potato starch and camphor; the brazing powder is at least one of AlSi12 and K3AlF6; the valve metal powder is at least one of Ti powder, TiO2, and BaTiO3.

3. The method of claim 1, wherein a mass fraction of the binder in the solution obtained in step (1) is 5%-10%; a solid content of the aluminum powder paste in step (3) is 60%-70%; in step (4), a thickness of the dried aluminum foil coated with aluminum powder after steps (5) and (6) is in the range of 30-80 μm, with no more than 30% difference in thickness at different locations.

4. The method of claim 1, a characteristic is that the pretreatment in step (4) involves grinding the aluminum foil to remove surface oil and partial oxide film, followed by immersion in a 40° C. to 60° C., 0.5 wt. % to 5 wt. % NaOH for 30 s to 300 s; after immersion, it is cleaned with deionized water and ethanol, then dried with cold air.

5. The method of claim 1, a characteristic is that a frequency of ultrasonic vibration in step (5) is 20 kHz to 50 kHz, with a power of 150 W to 250 W, and a duration of 30 s to 300 s.

6. The method of claim 1, a characteristic of the preparation method for sintered anode aluminum foil is that in step (7), the sintering process proceeds as follows: first, ramp up the temperature at a rate of 3-10° C./min to 200° C.-300° C., and hold for 30 min-60 min; then ramp up the temperature at a rate of 0.5-1° C./min to 450° C.-500° C., and hold for 4 h-6 h, finally, ramp up the temperature at a rate of 1-5° C./min to 600° C.-640° C., and hold for 3 h-10 h.

* * * * *